(12) United States Patent
Doi (10) Patent No.: US 6,938,066 B1
(45) Date of Patent: Aug. 30, 2005

(54) CUSTOMER NAVIGATION SYSTEM AND CUSTOMER NAVIGATION METHOD

(75) Inventor: Miwako Doi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 958 days.

(21) Appl. No.: 09/716,301

(22) Filed: Nov. 21, 2000

(30) Foreign Application Priority Data

Nov. 22, 1999 (JP) .................................. 11-331972

(51) Int. Cl.[7] .......................................... G06F 15/16
(52) U.S. Cl. ...................... 709/202; 709/228; 709/705; 709/26; 709/709; 709/206; 709/218
(58) Field of Search .......................... 701/200; 705/30, 705/26; 709/218, 202

(56) References Cited

U.S. PATENT DOCUMENTS

| | | | | |
|---|---|---|---|---|
| 5,468,942 A | * | 11/1995 | Oosterveen et al. | ........ 235/383 |
| 5,631,947 A | * | 5/1997 | Wittstein et al. | ....... 379/114.17 |
| 6,075,987 A | * | 6/2000 | Camp et al. | ................ 455/427 |
| 6,347,278 B2 | * | 2/2002 | Ito | .............................. 701/200 |
| 6,529,143 B2 | * | 3/2003 | Mikkola et al. | ......... 340/995.1 |
| 6,549,625 B1 | * | 4/2003 | Rautila et al. | .............. 380/258 |
| 6,550,672 B1 | * | 4/2003 | Tracy et al. | ................ 235/383 |
| 6,658,254 B1 | * | 12/2003 | Purdy et al. | ................ 455/445 |

OTHER PUBLICATIONS

U.S. Appl. No. 09/640,786, filed Aug. 18, 2000, Unknown.
U.S. Appl. No. 09/716,317, filed Nov. 21, 2000, Pending.
U.S. Appl. No. 09/716,301, filed Nov. 21, 2000, Pending.

* cited by examiner

Primary Examiner—Rupal Dharia
Assistant Examiner—Djenane Bayard
(74) Attorney, Agent, or Firm—Oblon, Spivak, McClelland, Maier & Neustadt, P.C.

(57) ABSTRACT

A custom navigation system is composed of a customer navigation terminal to be carried by a customer entering a facility having a memory function of information relating to the customer and a communication function with outside, a customer guide server installed at a particular point in the facility and, when the customer navigation terminal has come near, communicates with the terminal to perform a navigation of the customer. The customer navigation terminal has a nickname memory for storing a nickname of the customer, and the customer guide server has a caller for calling the nickname stored in the nickname memory and a voice synthesizer for synthesizing the called nickname as a voice.

1 Claim, 10 Drawing Sheets

| ITEMS | CONTENTS |
|---|---|
| NICKNAME | POKEKUN NO.1 |
| HEIGHT | 130 |
| AGE | 9 |
| ⋮ | ⋮ |

FIG. 4A

| ITEMS | CONTENTS |
|---|---|
| NICKNAME | POKEKUN NO.1 |
| SYNTHESIZED VOICE | VOICE OF POKEKUN |
| HEIGHT | 130 |
| AGE | 9 |
| ⋮ | ⋮ |

FIG. 4B

| ITEMS | CONTENTS |
|---|---|
| NICKNAME | POKEKUN NO.1 |
| SYNTHESIZED VOICE | VOICE OF POKEKUN |
| HEIGHT | 130 |
| AGE | 9 |
| GUARDIAN ID | 11 |
| ⋮ | ⋮ |

| ITEMS | CONTENTS | TIMES |
|---|---|---|
| NICKNAME | POKEKUN NO.1 | 99/11/10/9:15 |
| SYNTHESIZED VOICE | VOICE OF POKEKUN | 99/11/10/9:15 |
| HEIGHT | 130 | 99/11/10/9:15 |
| AGE | 9 | 99/11/10/9:15 |
| GUARDIAN ID | 11 | 99/11/10/9:15 |
| USE DATA | ATTRACTION A | 99/11/10/9:45 |
|  | ATTRACTION D | 99/11/10/10:45 |
| ⋮ |  |  |

F I G. 7A

| ITEMS | CONTENTS | START TIMES | END TIMES |
|---|---|---|---|
| NICKNAME | POKEKUN NO.1 | 99/11/10/9:15 | 99/11/10/9:20 |
| SYNTHESIZED VOICE | VOICE OF POKEKUN | 99/11/10/9:15 | 99/11/10/9:20 |
| HEIGHT | 130 | 99/11/10/9:15 | 99/11/10/9:20 |
| AGE | 9 | 99/11/10/9:15 | 99/11/10/9:20 |
| GUARDIAN ID | 11 | 99/11/10/9:15 | 99/11/10/9:20 |
| USE DATA | ATTRACTION A | 99/11/10/9:45 | 99/11/10/10:20 |
|  | ATTRACTION D | 99/11/10/10:45 | 99/11/10/11:00 |
| ⋮ |  |  |  |

F I G. 7B

| ITEMS | CONTENTS | WAITING START TIMES | START TIMES | END TIMES |
|---|---|---|---|---|
| NICKNAME | POKEKUN NO.1 | 99/11/10/9:00 | 99/11/10/9:15 | 99/11/10/9:20 |
| SYNTHESIZED VOICE | VOICE OF POKEKUN | 99/11/10/9:00 | 99/11/10/9:15 | 99/11/10/9:20 |
| HEIGHT | 130 | 99/11/10/9:00 | 99/11/10/9:15 | 99/11/10/9:20 |
| AGE | 9 | 99/11/10/9:00 | 99/11/10/9:15 | 99/11/10/9:20 |
| GUARDIAN ID | 11 | 99/11/10/9:00 | 99/11/10/9:15 | 99/11/10/9:20 |
| USE DATA | ATTRACTION A | 99/11/10/9:25 | 99/11/10/9:45 | 99/11/10/10:20 |
|  | ATTRACTION D | 99/11/10/10:25 | 99/11/10/10:45 | 99/11/10/11:00 |
| ... |  |  |  |  |

CUSTOMER NAVIGATION SYSTEM AND CUSTOMER NAVIGATION METHOD

CROSS-REFERENCE TO RELATED APPLICATIONS

This application is based upon and claims the benefit of priority from the prior Japanese Patent Application No. 11-331972 filed Nov. 22, 1999, the entire contents of which are incorporated herein by reference.

BACKGROUND OF THE INVENTION

There have been opened in recent years multiple large-scale attraction facilities such as theme parks, aquariums and museums. Such large-scale attraction facilities have a wide site area dotted with attractions and the like, and the attendant also reaches an enormous number. Therefore, relative to a small-scale amusement park or such, there is observed an unavoidable imperfection in quality of customer services, for example, with tendencies, such as for a guidance to be incomprehensive with mere usual announcements, hardly to be familiar, for movements between attractions to be time-consuming, and for a particular attraction and eating places there-around to be crowded with customers.

If a particular attraction or an eating place is crowded with customers, it is necessary to post there many employees to meet needs of the customers, in addition to a necessary device for customers to be kept from being bored during their waiting times. In some theme parks, while queuing, there is projected a picture such as a video picture relating to the attraction, as a trial to thereby consume time, which however is nonsense for those having already watched the video or those finding no interest therein and does not constitute an effective way of passing a waiting time.

If customers crowd in eating places near a particular popular attraction, eating places drawing few customers are unable to average the condition of use of foodstuffs and other resources, as a problem. Usual eating places are fixed in location, and it is impossible to dynamically reallocate eating places where customers are crowd. The reallocation of eating shops, if made, should be a reallocation following customers having crowded, and unable to timely cope with the crowd of customers.

In theme parks or the like, it takes time to move between attractions, and when a customer goes to an attraction not crowded, if customers reconciled at other crowded attractions as well as those having enjoyed crowded attractions move in the same timing, then the destined attraction is to be crowded, rendering meaningless an intention the customer had to avoid a crowded attraction.

Such as when moving between attractions, taking time, or while waiting in a long queue at a crowded attraction, bored young children tend to depart from their parents, getting lost, as a problem.

Large-scale attraction facilities such as a theme park allow enjoyment of diverse kinds of attractions, eating, etc., but are problematic in services such as for the use to be comprehensive, or in a waiting time elongated by crowd, or to avoid a crowd, as described above.

BRIEF SUMMARY OF THE INVENTION

An object of the invention is to provide a customer navigation system and a customer navigation method for providing a high-quality service to an entering customer such as at a large-scale attraction facility.

To solve the problems, the invention is characterized in that a customer entering a facility is made to carry a customer navigation terminal communicable with outside by a short-range radio, and a customer navigation is performed through the terminal.

More specifically, according to the invention, a customer entering a facility is made to carry a customer navigation terminal having a memory function of information relating to the customer and a communication function with outside, and when the customer navigation terminal has come near a customer guide server installed at a particular point in the facility, a customer navigation is performed by a communication between the customer navigation terminal and the customer guide server.

According to an aspect, the customer navigation terminal has an identification information memory configured to store identification information of the customer (for example, a nickname stated by the customer) carrying the terminal, the customer guide server has a caller configured to call the identification information stored in the identification information memory, and at least one of the customer guide server and the customer navigation terminal has a voice synthesizer configured to synthesize the identification information called by the caller as a voice.

It is enabled by the arrangement to provide a high-quality service to a customer entering a facility such as a theme park.

According to another aspect, the customer navigation terminal has a use data memory configured to store use data relating to a facility use of the customer in the facility, and the customer navigation system has a use data collecting device for recovering the customer navigation terminal to collect the use data stored in the use data memory. The use data memory stores, as the use data, e.g. data on a limit amount of use, a charge on use, a balance and a time of use of the customer in the facility.

It is enabled by the arrangement to acquire various use data relating to a facility use of the customer with ease without troubling the customer, permitting a quantitative improvement for efficient operation in accordance with the customer's desire.

Further, the invention is characterized by making a customer entering a facility carry a customer navigation terminal having an acquisition function of positional information of the customer in the facility and a communication function with outside, transmitting the positional information to a service server directly or indirectly communicating with the customer navigation terminal, having the service server respond to the positional information transmitted from the customer navigation terminal by planning a customer navigation method to generate customer navigation information in accordance with the customer navigation method, and transmitting the generated customer navigation information to the customer navigation terminal.

In other words, another customer navigation system according to the invention comprises a customer navigation terminal to be carried by a customer entering a facility and having a memory function of information relating to the customer and a communication function with outside, and a service server directly or indirectly communicating with the customer navigation terminal, the customer navigation terminal having a positional information acquiring unit configured to acquire positional information of the customer in the facility, a display unit configured to display the positional information on a map and facility information relating to an individual facility of the facility, and a first transmitter configured to transmit the positional information to the service server, and the service server having a navigation planning unit configured to respond to the positional information transmitted from the customer navigation terminal by planning a customer navigation method to generate customer navigation information in accordance with the customer navigation method, and a second transmitter configured to transmit the customer navigation information to the customer navigation terminal.

It is enabled by the arrangement to have improved services to the customer, such as by introducing thereto an non-crowded attraction, informing an attraction to take a reservation, or opening a stall in a crowded place, and concurrently for the facility side to average an operation ratio of resources, aiming at a great increase of sales.

The service server may have a section for dynamically setting a use price of the individual facility or a sales price of a particular article in the individual facility in accordance with the customer navigation method, and the navigation planning unit may reflect the set use price or sales price on the customer navigation information.

Like this, a navigation method planned on a basis of positional information or such can be followed to dynamically change, for example, a use price of an individual facility such as for an attraction in a theme park, or a sales price of a particular article in a shopping mall, thereby permitting an effective calling of customer, allowing for customer services to be improved, as well as for resources in the facility to be effectively utilized.

A customer navigation terminal according to the invention is to be carried by a customer entering a facility, and comprises an identification information memory configured to store identification information of the customer, and a transceiver configured to receive a call signal inputted from outside and to transmit outside the identification information read from the identification information memory.

Another customer navigation terminal according to the invention comprises a use data memory configured to store use data relating to a facility use of a customer including data on a limit amount of use, a charge on use, a balance and a time of use of the customer in a facility; and a transceiver configured to receive a call signal inputted from outside and to transmit outside the use data read from the use data memory means.

Another customer navigation terminal according to the invention comprises a positional information acquisition unit configured to acquire positional information of a customer in a facility, a display unit configured to display the positional information on a map and facility information relating to an individual facility of the facility, and a transmitter configured to transmit the positional information outside.

According to the invention, a customer entering a facility is let to carry a customer navigation terminal capable of communication with outside by a short-range radio, and a customer navigation is performed through the terminal, thereby implementing a system that allows in a large-scale facility such as a theme park or shopping mall for an entering customer to be provided with high-quality services, and for the facility side as well to aim at a smooth and efficient operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described below with reference to the drawings.

First Embodiment

Figure 1:
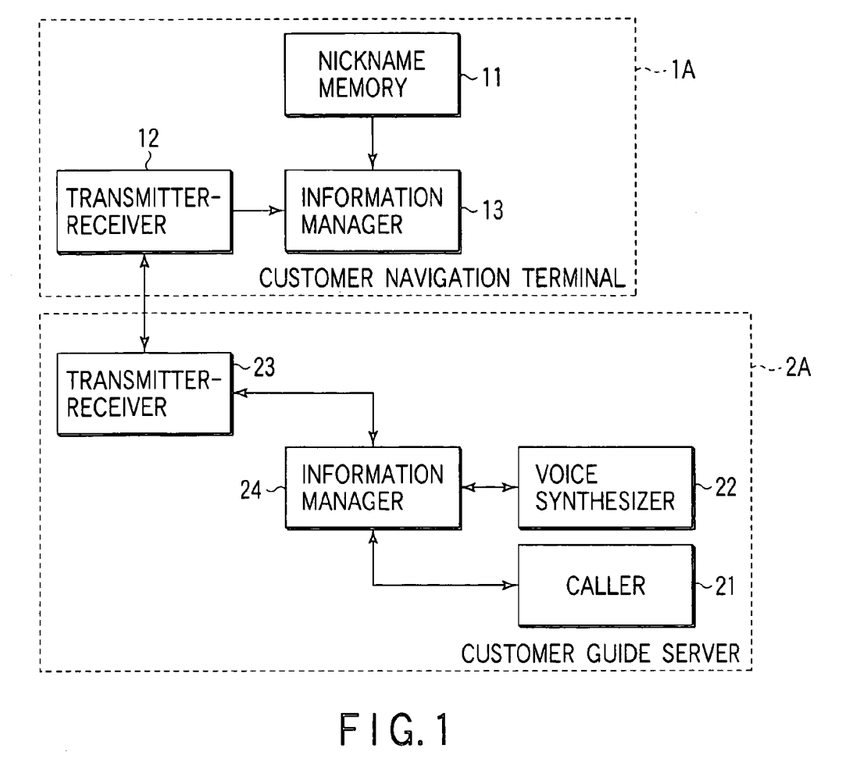
FIG. 1 is a block diagram showing an arrangement of a customer navigation system according to a first embodiment of the invention.

FIG. 1 shows a schematic arrangement of a customer navigation system according to the first embodiment of the invention. This customer navigation system is constituted roughly with a customer navigation terminal 1A to be carried by a customer, and a customer guide server 2A installed in a facility such as a theme park. Hereinafter, for a simplified description, the facility to which a customer navigation system is applied is assumed as a theme park.

Figure 2:
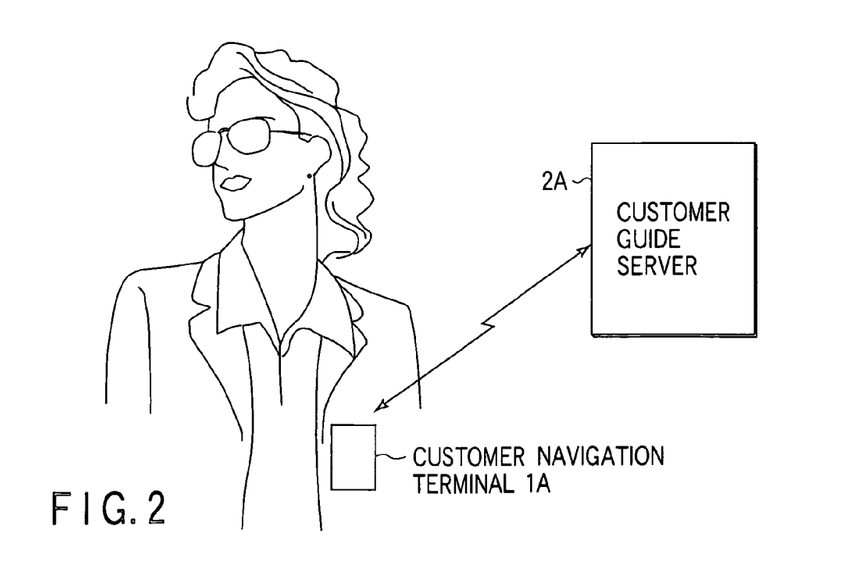
FIG. 2 is an illustration showing an example of appearance of a customer navigation terminal in the invention.

The customer navigation terminal 1A has a function such as of a kind of prepaid card or one-day ticket usable such as at a attraction or eating place in the theme park and a communication function limited to be communicative within the theme park, and is configured, as a thin film such as a seal with printed circuit components, to be adhesive, such as by a magic tape such as to the user's cloth, and to be attached without burden to the user, as illustrated in FIG. 2. The customer navigation terminal 1A in FIG. 2 is rectangular in configuration, but not limited to the configuration.

The customer navigation terminal 1A is made by a nickname memory 11 like a memory card as an identification information memory for mainly storing identification information (to be called a nickname) identifiable as an own provisional name of the customer itself, with the customer's anonymity kept, a transmitter-receiver 12 for communications to be made by a short-range radio, such as a Bluetooth, with a device authenticated in advance, such as at an attraction or charge collector installed in the theme park, and an information manager 13 for information management between the nickname memory 11 and the transmitter-receiver 12. The information manager 13 may have output functions, such as for a voice output or image display, as necessary.

Figure 4A:
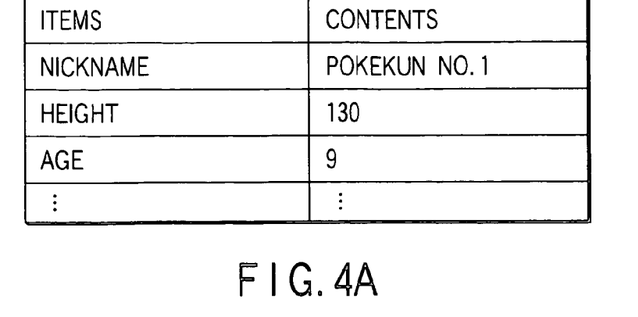
FIG. 4A to FIG. 4C are diagrams showing memory contents of a nickname memory in the embodiment.
Figure 4B:
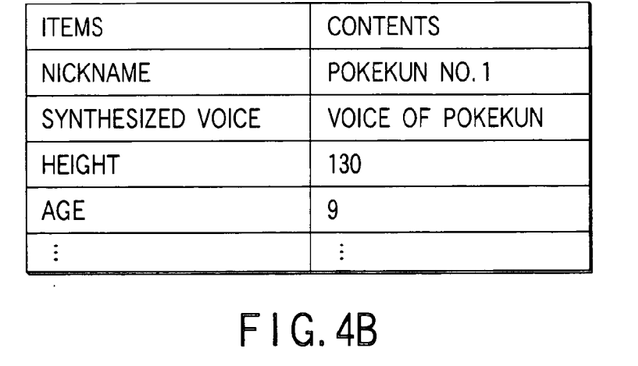
Figure 4C:
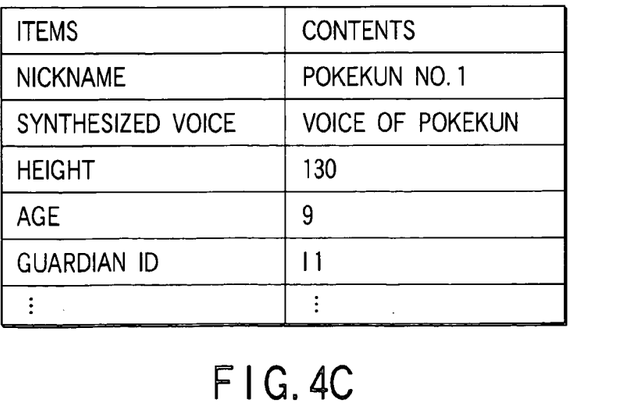

The nickname memory 11 is adapted, as shown in FIG. 4A to FIG. 4C, to memorize the customer's nickname and, besides, parameters, such as the height and age, that do not invade the person's privacy, but are necessary for use, such as of an attraction. Those contents of memory are written by input operations such as of the nickname, such as by use of a voice or menu selection, upon purchase of an entrance ticket (with a rental of a customer navigation terminal 1 inclusive) when entering the theme park.

The customer guide server 2A is installed at such particular points as attractions or charge collecting devices in the theme park or as base stations scattered in the theme park, and gives the customer necessary navigation information by outputting in voice the nickname stored in the nickname memory 11 of the customer navigation terminal 1A carried by the customer. A speaker for the audio output may be installed in the customer guide server 2A, or may be by use of a PA speaker in the theme park.

More specifically, the customer guide server 2A is made by a caller 21 (to be constituted with a speaker for example) for calling, from the customer navigation terminal 1A, the nickname stored in the nickname memory 11, a voice synthesizer 22 for synthesizing as a voice the nickname called by the caller 21, a transmitter-receiver 23 for making communications by a short-range radio, such as a Bluetooth, with the transmitter-receiver 12 in the customer navigation terminal 1A, and an information manager 24 for performing a management of information among the caller 21, the voice synthesizer 22 and the transmitter-receiver 23.

Figure 3:
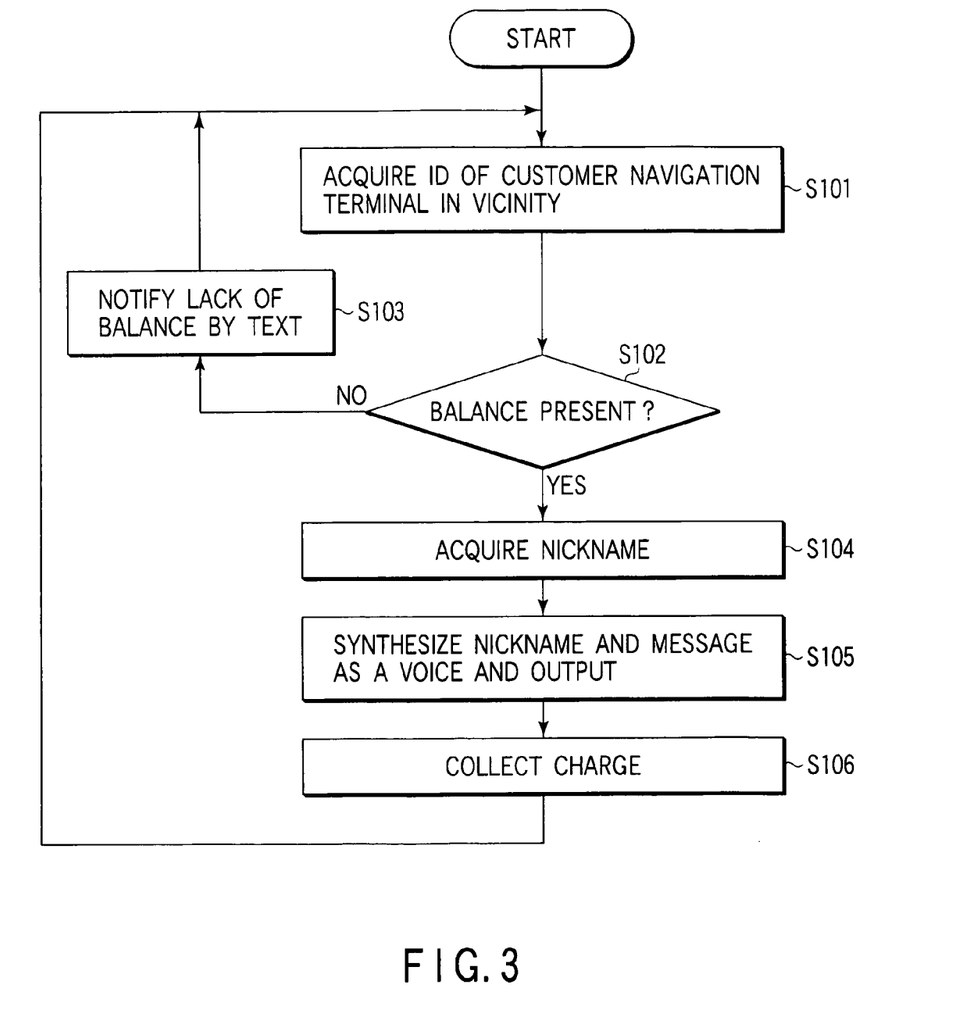
FIG. 3 is a flowchart showing a flow of a process in the embodiment.

Next, there will be described a processing procedure of the information manager 24 in the customer guide server 2 of FIG. 1, using the flowchart of FIG. 3.

First, the information manger 24 detects, via the transmitter-receiver 23, for a customer navigation terminal 1A waiting in order in a vicinity of the customer guide server 2A, and if any present there, acquires a proper ID the customer navigation terminal 1A has (step S101), and checks if its balance is sufficient for use at an attraction or eating place where the customer guide server 2A is installed (step S102). The detection for the customer navigation terminal is made to detect the position, for example, by a decision as to which one of a plurality of Bluetooth base stations has received a communication from the customer navigation terminal.

Unless a necessary balance is left, the information manger 24 transmits the effect of a short balance from the transmitter-receiver 23 to the transmitter-receiver 12 of the customer navigation terminal 1A, notifying a user of the customer navigation terminal 1A (step S103). At this time, for a protection of the user's privacy, there is transmitted a message of the short balance in a text without using a voice. The user can confirm the text message through an unshown output device, such as a liquid crystal display, provided for the customer navigation terminal 1A.

On the other hand, if a necessary balance is left at the step S102, the information manager 24 acquires a nickname from the nickname memory 11, via the transmitter-receiver 12 and the transmitter-receiver 23 (step S104). The acquired nickname is converted by the voice synthesizer 22 into a synthesized voice, together with a message informing that an attraction or eating shop where the customer guide server 2A is installed can be used (step S105). Then, a charge is collected (step S106), and the flow again goes to the step S101, repeating like process.

At the step S105, if the nickname is "Pokekun No. 1" for example, there is generated a synthesized voice such that "Mr. Pokekun No. 1, thank you for your use". The synthesized voice is output from a speaker installed in the customer guide server 2A or from a PA service in the theme park, or is transmitted, through the information manager 24, from the transmitter 23 to the customer navigation terminal 1A, where it is output, through transmitter-receiver 12 and the information manager 13, from an not-shown small speaker provided for the customer navigation terminal 1A. Although the voice synthesizer 22 is provided on the customer guide server 2A side in this embodiment, a voice synthesizer may be provided on the customer navigation terminal 1A side.

In regard of the synthesized voice, conversions can be made with ease, for example, such that the pitch is varied in accordance with a parameter stored in the nickname memory 11, or that the voice quality is changed to that of a character the customer likes. If the synthesized voice is designated to be a "voice of Pokekun" as shown in FIG. 4B, it is possible to give a nickname or message in the voice of Pokekun as a character. What kind of voice can be used is associated with the issue of copy right, and is selected from kinds of voices prepared in advance when entering the theme park. At the theme park end, it also is possible to make a campaign such as by changing available voices by seasons.

In this example, at the step S102, there is made a check merely of a balance, which however does not always constitute a limitation. For example, if a taller height than 120 cm is necessary, a row of height stored in the nickname memory 11 as shown in FIG. 4A and FIG. 4B can be referred to, or if merely ages of 4 years or more are permissible, a column of age stored in the nickname memory 11 as shown in FIG. 4A and FIG. 4B can be referred to for a decision as to whether the user meets a preset limitation of use. In failure to meet the limitation of use, there can be given at the step S103 a notification to the customer navigation terminal 1A, with a message such that "height is shorter than 120 cm, and regretful for the use to be impossible" or that "children under 4 years of age must be accompanied with a guardian to ride".

If a child having not reached an age limitation is going to use an attraction or the like without a guardian, then, for example, a guardian ID stored in the nickname memory 11 as shown in FIG. 4C may be detected to inform a message to a customer navigation terminal 1 having the detected guardian ID, such that "the child is trying to ride alone on XXX (attraction name), which however needs an accompanying guardian".

According to this embodiment, though in terms of a nickname having a anonymity, a customer is called in guidance by own name, and can carefully hear a message, such as a caution to use of an attraction. At the theme park end, there can be achieved a higher propaganda effect than usual, by making the customer listen to a commercial or the like when having called the customer by the nickname, arousing the attention.

Moreover, services can be provided with an increased intimacy from small children to advanced ages.

Further, when a child gets lost, a guardian ID stored in the nickname memory 11 can be utilized as well to inform the guardian of the effect, permitting a smooth operation such as of a theme park or shopping mall.

Like this, according to the embodiment, a customer entering a facility such as a theme park can receive a higher quality of service than in the past, allowing the facility side also to have various advantages such as an improved propaganda effect and smooth operation.

Second Embodiment

Figure 5:
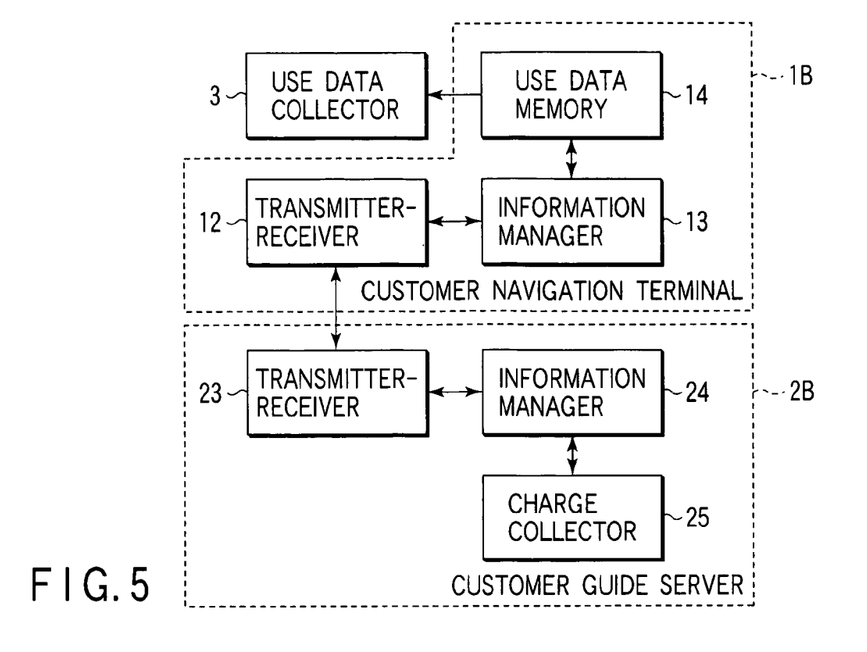
FIG. 5 is a block diagram showing an arrangement of a customer navigation system according to a second embodiment of the invention.

FIG. 5 shows a schematic arrangement of a customer navigation system according to a second embodiment of the invention. The customer navigation system is constituted with a customer navigation terminal 1B, a customer guide server 2B, and a use data collector 3.

The customer navigation terminal 1B has, besides a transmitter-receiver 12 and an information manager 13, a use data memory 14 for storing use data relating to a facility use of a customer in a facility such as a theme park or shopping mall, and more specifically, a limit charge for use, a charge for use, a time of use, a balance, etc. The use data memory 14 is a card-like medium mounted as a small memory chip of a stamp size employable such as for music distribution for example, and detachably attached to the customer navigation terminal 1B.

The transmitter-receiver 12 makes transmission to and reception from a component having an established authentication, such as a charge collector installed in the facility, as described, and the information manager 13 manages use data such as of charge collection by the transmitter-receiver 12, managing a writing and calling of use data at the use data memory 14.

The customer guide server 2B has a charge collector 25 for collecting a charge from the customer navigation terminal 1B, via a transmitter-receiver 23. The transmitter-receiver 23 is for communication with the customer navigation terminal 1B, and an information manager 24 performs an information management between the transmitter-receiver 23 and the charge collector 25.

The use data collector 3 is installed in adequate places such as an attraction or a vicinity of an exit of the theme park for example, for recovering a customer navigation terminal 1B after use of a customer, and collects use data stored in the use data memory 14. The use data memory 14, which is of a card-like medium (smart medium) for example and detachably attachable to the customer navigation terminal 1B, as described, is removed from the customer navigation terminal 1B upon the recovery, and inserted into the use data collector 3, so that the use data stored in the use data collector 14 can be read to be collected.

As the customer navigation terminal 1B itself has a card-like or seal-like thin configuration, the customer navigation terminal 1B may be inserted as it is, into the use data collector 3, so that use data stored in the use data memory 14 can be read to be collected, and the customer navigation terminal 1B can be recovered. Further, the transmitter-receiver 12 of the customer navigation terminal 1B may be used for collecting by radio the use data stored in the use data memory 14.

Figure 6:
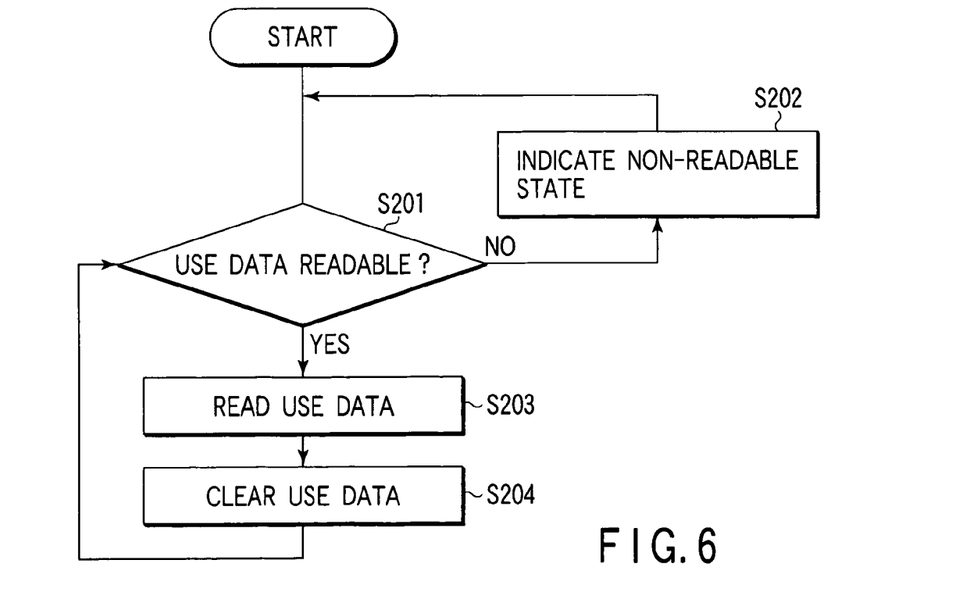
FIG. 6 is a flowchart showing a flow of a process in the embodiment.

There will be described a processing procedure of the use data collector 3, using the flowchart of FIG. 6.

First, it is checked if the use data memory 14 is in a readable state (step S201), and unless it is readable, the effect is displayed (step S204). If the use data memory 14 is readable, use data stored therein are read (step S202), and the stored use data are cleared (step S203).

Figure 7A:
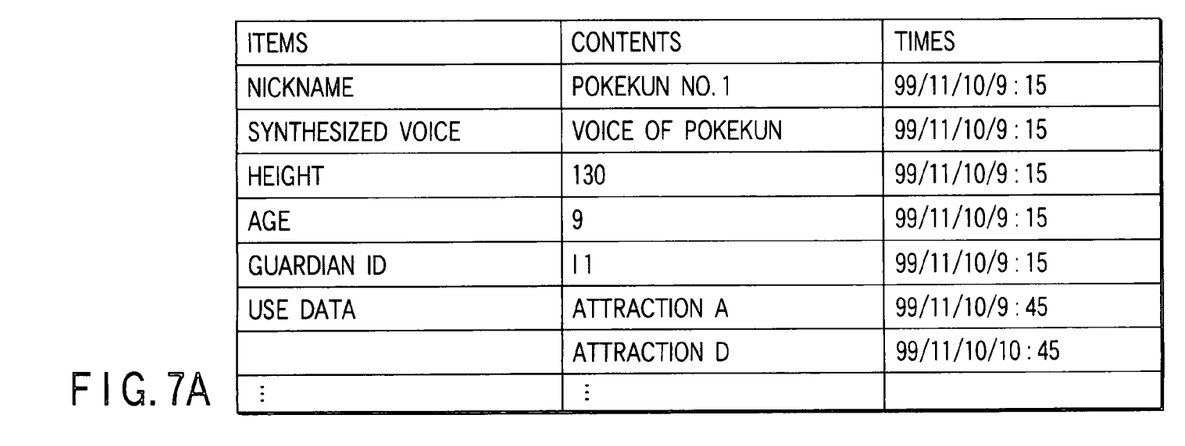
FIG. 7A to FIG. 7C are diagrams showing memory contents of a use data memory in the embodiment.
Figure 7B:
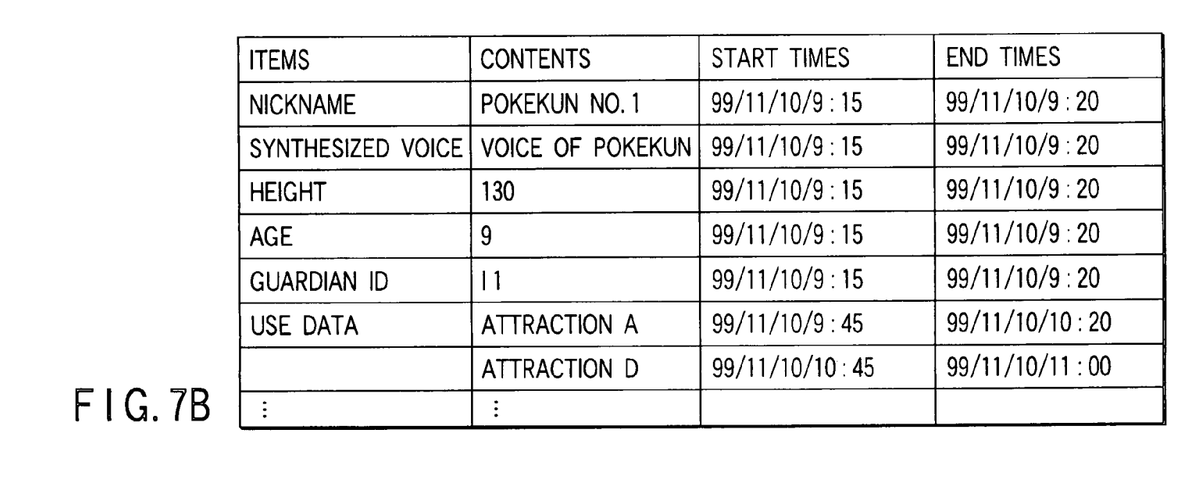
Figure 7C:
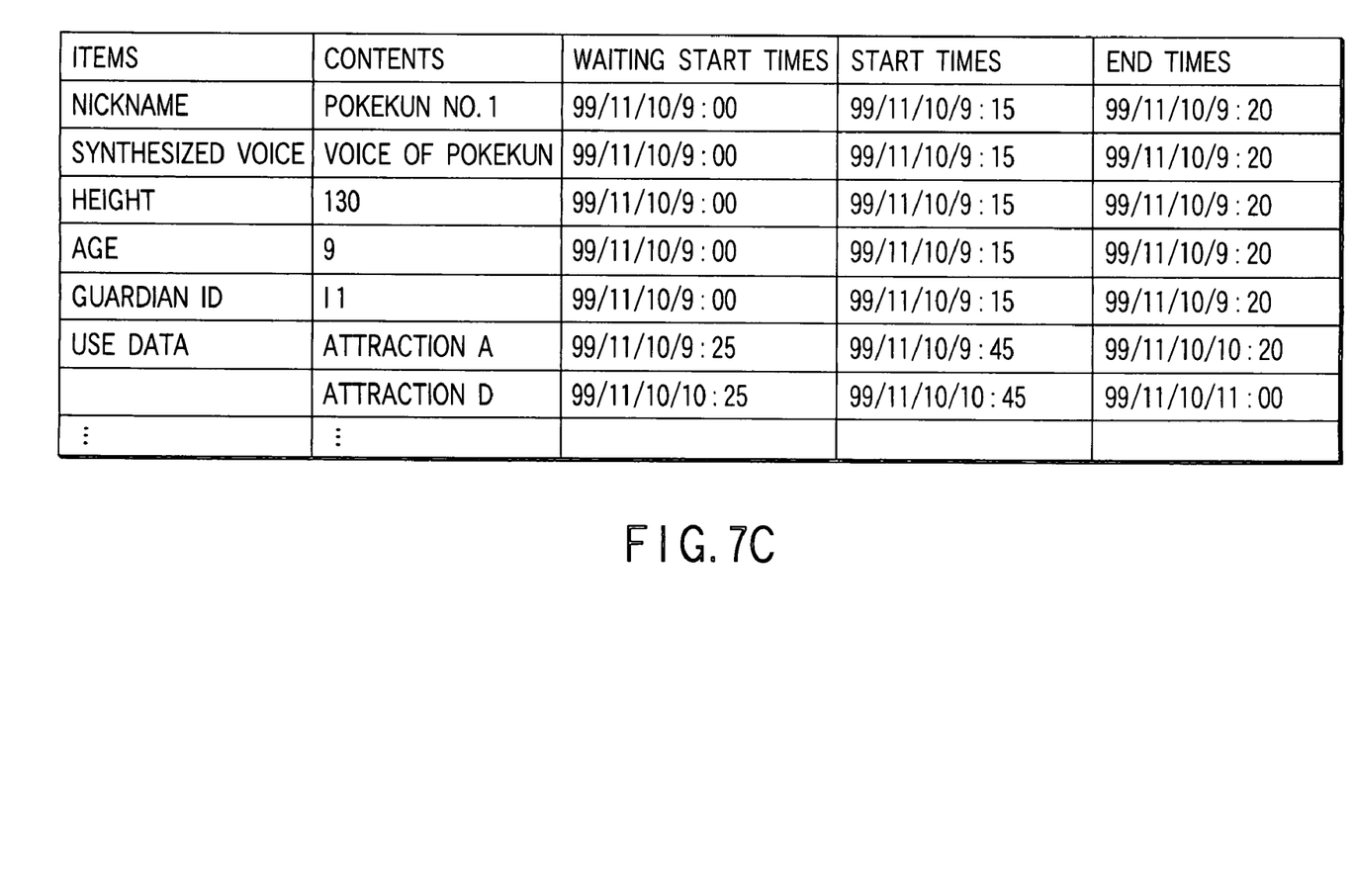

In the use data memory 14 are stored, for example, a type of attraction used and a time of use as shown in FIG. 7A. As another example, the data of use time may be separated into a use start time and an end time, to be stored as shown in FIG. 7B, or a waiting start time, i.e., the time when a waiting is started may be added to be stored as shown in FIG. 7C. There are concurrently shown in FIG. 7A to FIG. 7C the contents of a nickname memory 11 described in the first embodiment.

Figure 8:
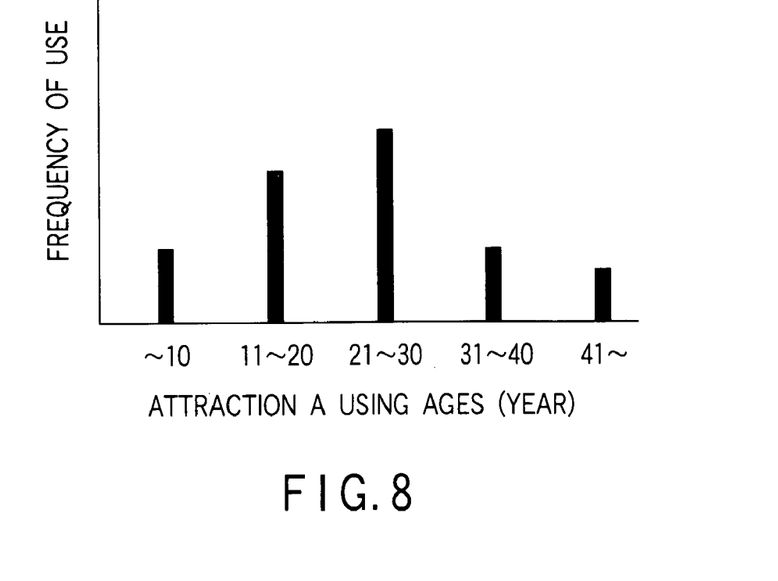
FIG. 8 is a diagram showing a relationship between an attraction using age and a frequency of use as a result of collection by a use data collector in the embodiment.
Figure 9:
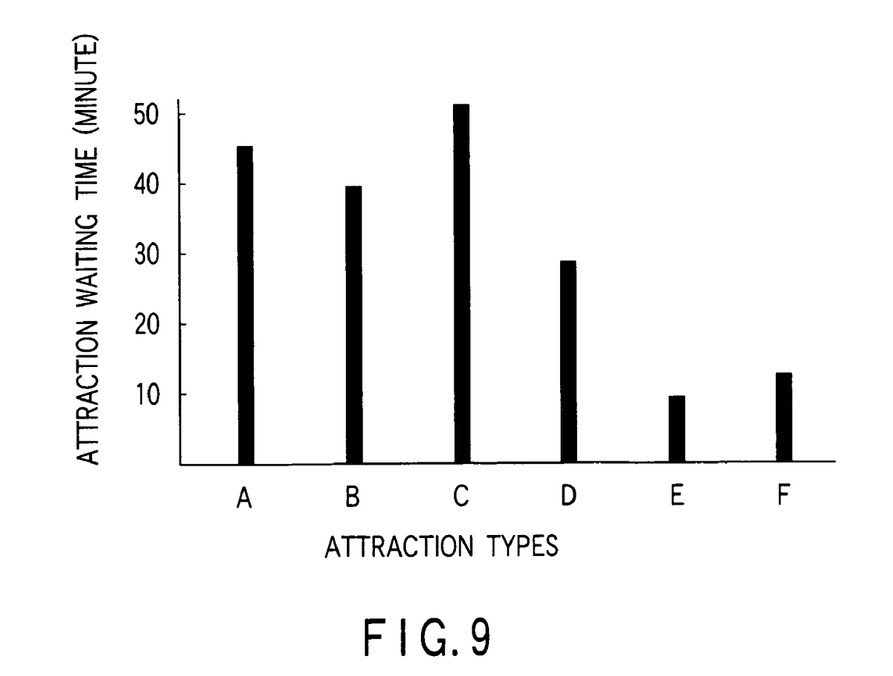
FIG. 9 is a diagram showing a relationship between attraction types and a waiting time as another result of collection by the use data collector in the embodiment.

The use data collector 3 performs a variety of summations based on collected use data, reflecting the results on services such as in a theme park. More specifically, the use data collector 3 sums use frequencies of attractions by customer ages as shown in FIG. 8 for example. FIG. 8 is an example of an attraction A, while like summations of use frequencies are made of other attractions B, C, . . . , as well. Moreover, waiting times are summed by attraction types A, B, C, . . . , respectively, as shown in FIG. 9 for example. Further, though not illustrated, the use data collector 3 may perform summations such as of a customer crowdedness at each attraction, an interval between from the use start time to the end time, or an interval as the interval between use start time and end time minus an actual time.

Assuming the attraction A be designed for a generation of twenties as its target, a summation of FIG. 8 shows a result as designed, proving the design to be correct. On the contrary, if the attraction A be designed for a generation of teens as the target, the design is somewhat different, and a cause of the deviation in design may be found such as by comparison with another attraction popular to the teens' generation. Further, a summation result of FIG. 9 may be used, for example, for analysis to determine what type of attraction has an abnormally long waiting time of 50 minutes or more, and to take a measure for the waiting time to be shorter.

Further, a time zone high of use frequency can be seen by every attraction, and such as by disposing a stall for selling light meals such as pop corn and hot dog in the time zone, there can be made a reflection of summation result so as to permit an improved customer service and an increased sales such as of an eating place to be concurrently achieved.

Like this, according to the embodiment, various use data relating to a facility use of a customer can be obtained with ease without troubling the customer, permitting an improvement for efficient operation to be quantitatively performed in accordance with customer's desire.

Third Embodiment

Figure 10:
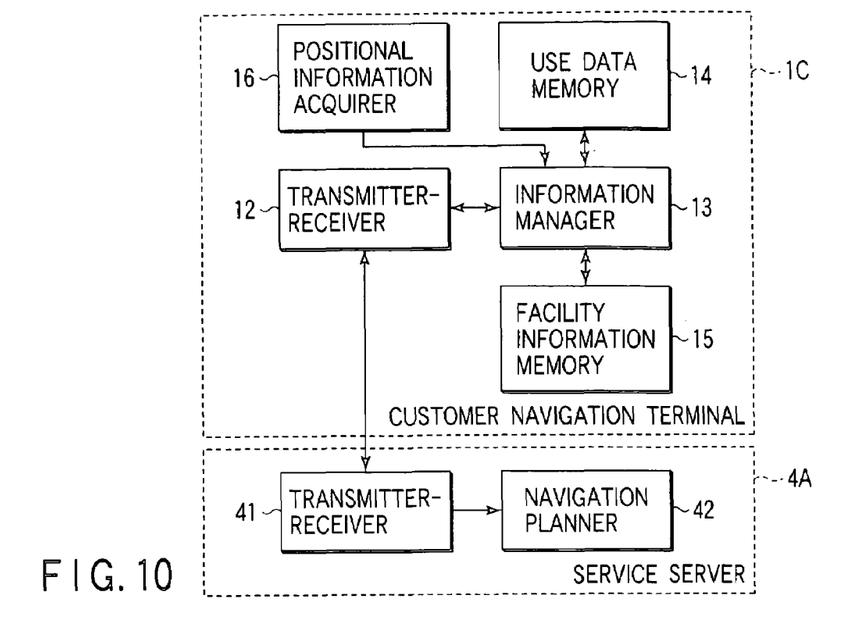
FIG. 10 is a block diagram showing an arrangement of a customer navigation system according to a third embodiment of the invention.

FIG. 10 is a diagram showing an arrangement of a customer navigation system according to a third embodiment of the invention. The customer navigation system is constituted with a customer navigation terminal 1C and a service server 4A.

The customer navigation terminal 1C has, besides the arrangement of the second embodiment shown in FIG. 5, a facility information memory 15 for storing a map of a facility such as a theme park or shopping mall and facility information relating to individual facilities (attractions, sales shops, etc.), and a positional information acquirer 16 for acquiring positional (current place) information of a customer in the facility. The positional information acquirer 16 acquires the position in dependence on which Bluetooth base station has received a communication from the customer navigation terminal 1C.

On the other hand, the service server 4A is made by a transmitter-receiver 41 for directly or indirectly communicating with the customer navigation terminal 1C, and a navigation planner 42 for responding to customer positional information received from the customer navigation terminal 1C, via the transmitter-receiver 41, to plan a customer navigation method. The service server 4 transmits customer navigation information in accordance with the navigation method planned by the navigation planner, from the transmitter-receiver 41 to the customer navigation terminal 1C, to thereby make a customer navigation such as in correspondence to a crowded condition.

Next, there will be given concrete description of examples of actions in the embodiment, by using FIG. 11.

A customer a (advanced age) and a customer b (infant) have their customer navigation terminals 1C. Each customer navigation terminal 1C recognizes a current position of the customer by communication with a repeater through the positional information acquirer 16, such as by use of a short-range radio such as a Bluetooth. The positional information indicating the current position is transmitted, from the transmitter-receiver 12 through a not-shown repeater to the service server 4A, where it is received by the transmitter-receiver 41 and sent to the navigation planner 42.

Figure 11:
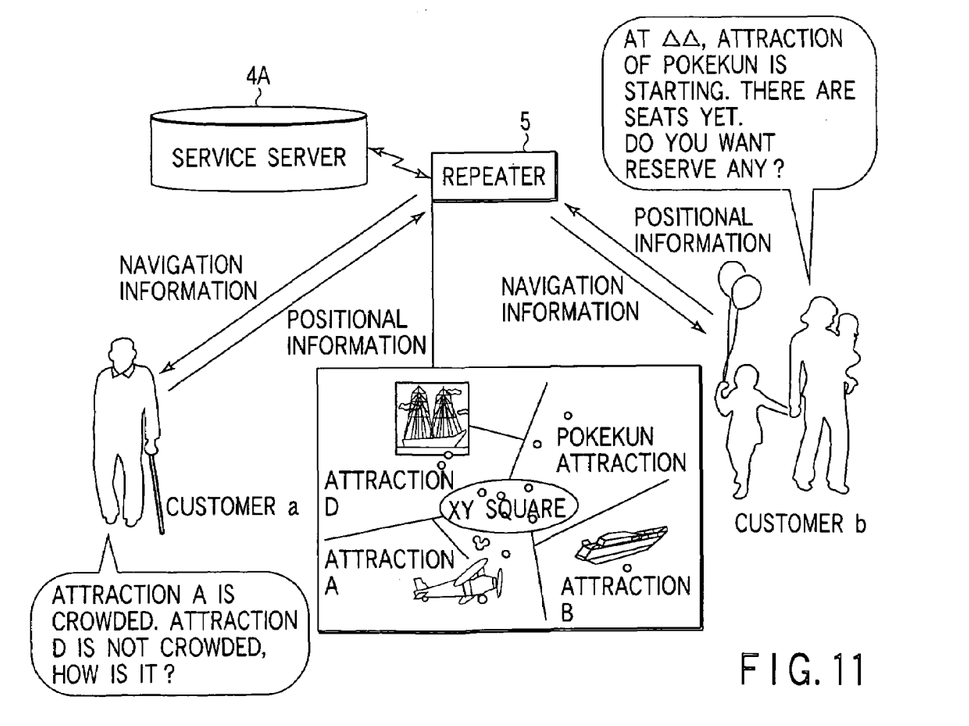
FIG. 11 is an illustration for describing examples of concrete actions in the embodiment.

The navigation planner 42 collects positional information thus sent from respective customer navigation terminals 1C, indicating the positional information, for example, as black dots on a map prescribed in a lower region of FIG. 11. The navigation planner 42 plans a navigation method on bases of a crowd condition recognized from the positional information and of contents of use data sent from use data memories 14 of the customer navigation terminals 1C via like paths to the positional information, and generates customer navigation information in accordance with the navigation method. The navigation planner 42 may for example perform a calculation using an optimization algorithm, such as a linear programming. More specifically, it may for example prepare a function from a crowd condition at each attraction, a waiting queue of customer waiting the attraction, and parameters such as necessary times for the customer waiting the attraction to move to other attractions, giving weights to the parameters, varying the parameters so that the function takes a maximum value.

The customer navigation information is transmitted from the transmitter-receiver 41 through a repeater (not shown) to the customer navigation terminal 1C, where it is received by the transmitter-receiver 12 and input to the information manager 13. The information manager 13 displays the input customer navigation information on a display (not shown) thereby perform a customer navigation. As the use data memory 14 has an age of the customer stored therein as shown in FIG. 7A, 7B or 7C, the customer navigation can be varied in dependence on the age as well as on the crowd condition.

For example, as an attraction A is crowded, the navigation planner 42 makes a plan to recommend other attractions to some of customer queuing at the attraction A that are selected in consideration of the age. For example, for customers selected from a view point of their ages, such navigation information is presented that "Attraction A is crowded. Attraction D (enjoyable for aged person) is not crowded, how is it?, as shown in FIG. 11.

Figure 12:
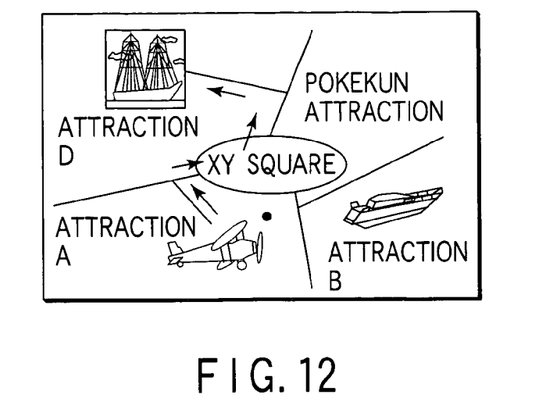
FIG. 12 is an illustration showing an example of display on a customer navigation terminal in the embodiment.

By presentation of such navigation information, a customer navigation terminal 1C the customer a carrying has a current position of the customer a and a position of the attraction D displayed on a map stored in the facility information memory 15 as shown in FIG. 12. Therefore, the customer a is allowed to decide, after confirmation of the display, whether to move to the attraction D in accordance with the navigation.

The navigation planner 42 may be configured not simply to plan a navigation method in view of a degree of crowd about a customer, but also to make such a navigation as to positively propagate held events. More specifically, if, for example, a popular attraction "Pokekun" to be held still has non-reserved seats, there are selected matching ages to the attraction from ages of customer stored in use data memories 14, and invitations are given.

For example, for a customer b who is infant, the navigation planner 42 notifies such navigation information that "At . . . , attraction of Pokekun is starting. There are seats yet. Do you want reserve any?", through a customer navigation terminal 1C the customer b carrying. If the customer b or guardian thereof gives a consent to reserving seats in response to the navigation information, then a corresponding number of seats are reserved, enabling a navigation from a current position to an attraction center as well as to the seats to be performed in accordance with contents of the facility information memory 15. The customer's consent to reserving seats can be given, for example, by selecting "YES" or "NO" buttons provided on the customer navigation terminal 1C.

The navigation planner 42 may prepare a plan such as for movement of a light meal shop, for example a stall for selling pop corn, to a crowded place in accordance with such a crowd condition as shown in FIG. 11.

Like this, according to the embodiment, there are given advantages to the customer, such that customer services can be improved such as by guiding a non-crowded attraction to the customer, by informing an attraction and taking a reservation, or by opening a stall in a crowded place, as well as to the facility side, such that sales can be greatly increased by averaging a running ratio of resources.

Fourth Embodiment

Figure 13:
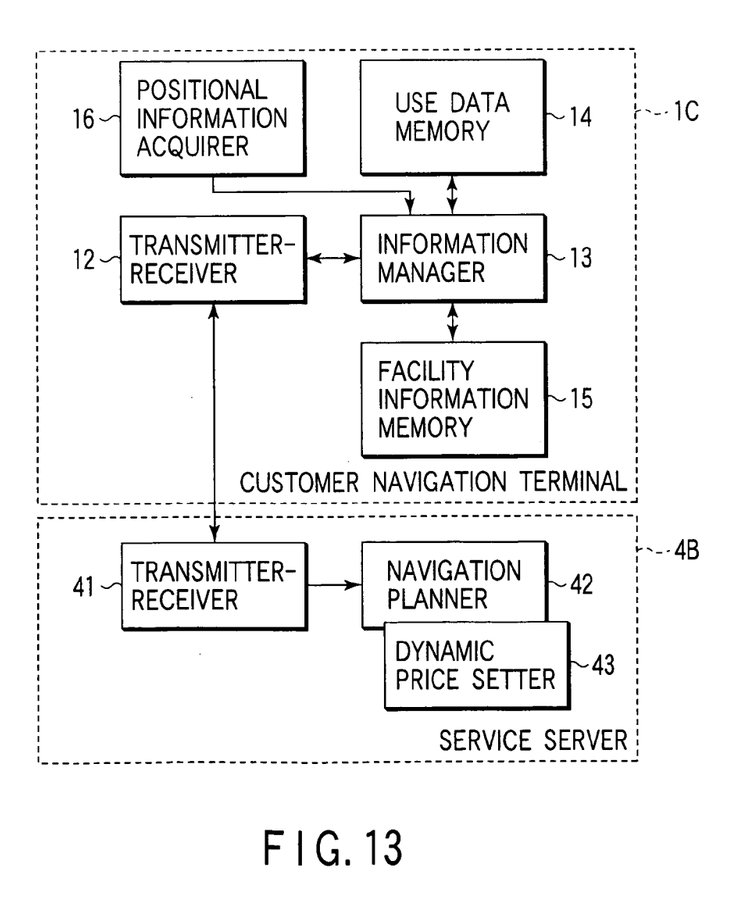
FIG. 13 is a block diagram showing an arrangement of a customer navigation system according to a fourth embodiment of the invention.

FIG. 13 shows an arrangement of a customer navigation system according to the fourth embodiment of the invention. In this embodiment, a service server 4B has a dynamic price setter 43 in addition to the arrangement of the third embodiment shown in FIG. 10.

In the third embodiment, a customer navigation is made in accordance with a crowd state at an attraction, age of customer, etc. It should however be noted that guiding a non-crowded attraction simply because of a crowd will not always cause customer to move as planned. That is, such a navigation does not always give a significant impact to the customer. To this point, the fourth embodiment employs the dynamic price setter 43 to perform more positive navigation such as by rendering cheaper than usual the use price (charge) of a non-crowded attraction.

The dynamic price setter 43 acquires, besides positional information acquired from a customer navigation terminal 1C for example, waiting time information by attractions, such as shown in FIG. 9, from a use data memory 14 of a customer navigation terminal 1. Based on the information acquired, the dynamic price setter 43 sets up an expectation function value, for example like the following, and dynamically sets a price to meet it.

Expectation function $$= ((\text{normal price} - \text{set price})/\text{normal price}) (\text{waiting time} - \alpha)^2$$

Figure 14:
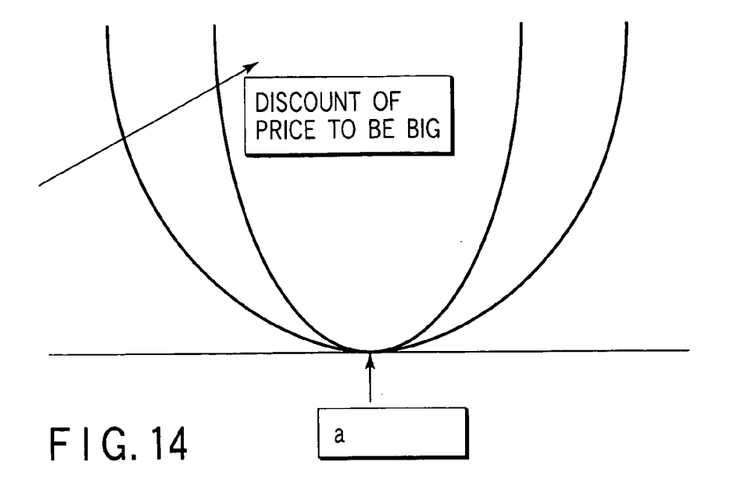
FIG. 14 is a diagram showing an example of an expectation function used in a dynamic price setter in the embodiment.

This expectation function is set so that the waiting time becomes 0 at an optimal $\alpha$ (for example, 5 minutes). More specifically, the function has a steeper inclination, as a discount width increases, as shown in FIG. 14 for example. A price is dynamically set by such an expectation function, for position invitation of customer, whereby resources such as attractions can have an increased operation efficiency.

Figure 15:
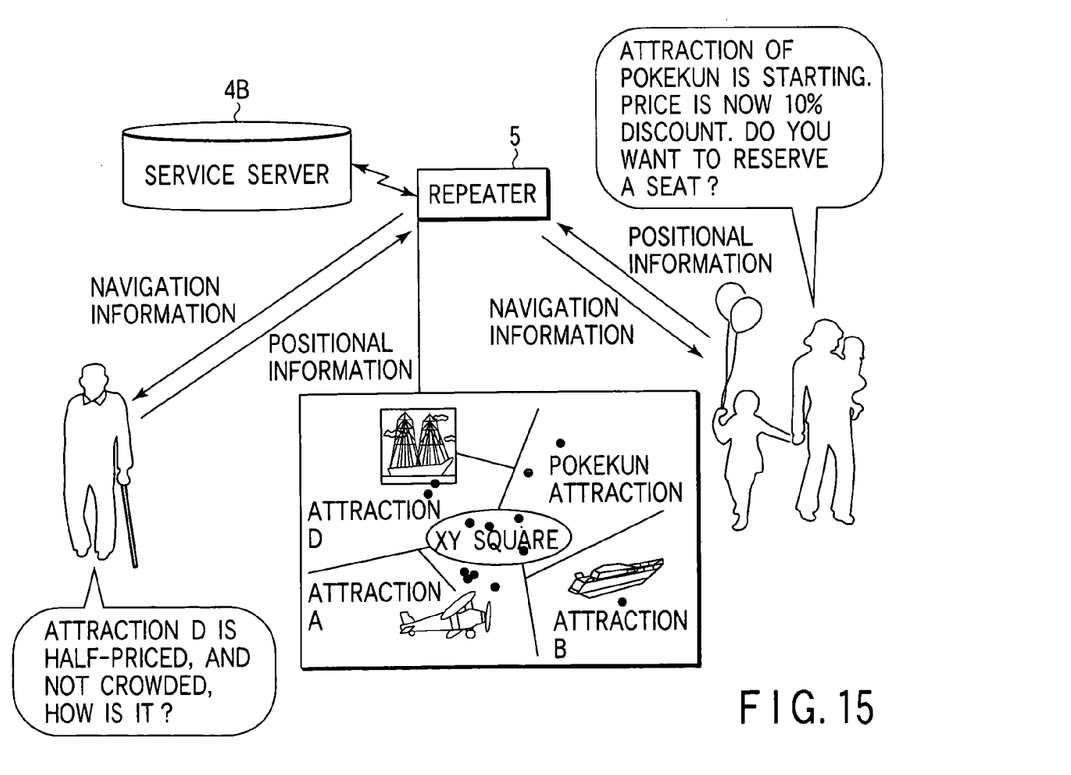
FIG. 15 is an illustration for describing examples of concrete actions in the embodiment.

In this case, the navigation information appeals a price discount, such that "Attraction D is half-priced, and not crowded, how is it?" or that "Attraction of Pokekun is starting. Price is now 10% discount. Do you want to reserve a seat?, as shown in FIG. 15 for example.

In the examples of actions described, a theme park is exemplified for description, which however does not constitute a limitation. For example, in a shopping mall, if it is desired to immediately sell out fresh foods such as raw fish and vegetables, there may be set an expectation function such as by using the number of neighboring customer in place of a waiting time as a parameter for price setting, thereby permitting a dynamic price setting.

Like this, according to the embodiment, there are effected dynamic variations such as of use prices of individual facilities such as attractions in a theme park or selling prices of particular articles in a shopping mall, in accordance with a navigation method planned on bases such as of positional information, allowing for customer to be effectively called up, permitting an improved customer service, as well as promotion of an effective utilization of resources in a facility.

While there have been described several embodiments of the invention, the invention is not limited to those embodiments, and arrangements of the first to the fourth embodiments may be adequately combined to be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A service server for directly or indirectly communicating with a customer navigation terminal to be carried by a customer entering a facility and having a memory function of information relating to the customer and a communication function with outside, comprising:

a navigation planning unit configured to respond to positional information of the customer in the facility, transmitted from the customer navigation terminal, by planning a customer navigation method to generate customer navigation information in accordance with the customer navigation method:

a transmission unit configured to transmit the customer navigation information to the customer navigation terminal; and a dynamic price setting unit configured to respond to waiting time information by attractions acquired from the customer navigation terminal to dynamically set a price meeting an expectation function=((normal price−set price)/normal price) (waiting time−$\alpha)^2$, where $\alpha$ is an optimal waiting time.

* * * * *